United States Patent [19]

Joshi

[11] 3,895,613

[45] July 22, 1975

[54] AIR-COOLED INJECTION INTERNAL COMBUSTION ENGINE WITH TURBULENCE CHAMBER

[75] Inventor: Suryakant Joshi, Cologne, Germany

[73] Assignee: Klockner-Humboldt-Deutz Aktiengesellschaft, Cologne, Germany

[22] Filed: Oct. 11, 1973

[21] Appl. No.: 405,651

[30] Foreign Application Priority Data
Oct. 11, 1972  Germany.......................... 2249766

[52] U.S. Cl............................................. 123/32 C
[51] Int. Cl............................................. F02b 3/00
[58] Field of Search.............. 123/32 Y, 32 C, 30 D

[56] References Cited
UNITED STATES PATENTS

| | | | |
|---|---|---|---|
| 2,110,191 | 3/1938 | Bagnulo | 123/34 |
| 2,120,768 | 6/1938 | Ricardo | 123/193 |
| 2,795,215 | 6/1957 | Holt | 123/32 |
| 2,853,060 | 9/1958 | Hockel | 123/32 |
| 2,977,941 | 4/1961 | Hockel | 123/32 |

*Primary Examiner*—Manuel A. Antonakas
*Assistant Examiner*—James W. Cranson, Jr.
*Attorney, Agent, or Firm*—Walter Becker

[57] ABSTRACT

An air-cooled injection internal combustion engine with a turbulence chamber in the cylinder head has an insert member provided as a portion of that inner mantle surface which is not impacted upon by the fuel jet. The insert member is smaller than one quarter of the inner mantle surface of the turbulence chamber. The insert member is formed by a well heat-insulated heat-resistant material and comprises a passage leading from the cylinder to the turbulence chamber. The insert member has a medium height equaling from one-fourth to one-third of the maximum diameter of revolution of the turbulence chamber. The medium diameter of the insert member equals from one-third to one total of the maximum diameter of revolution of the turbulence chamber.

1 Claim, 1 Drawing Figure

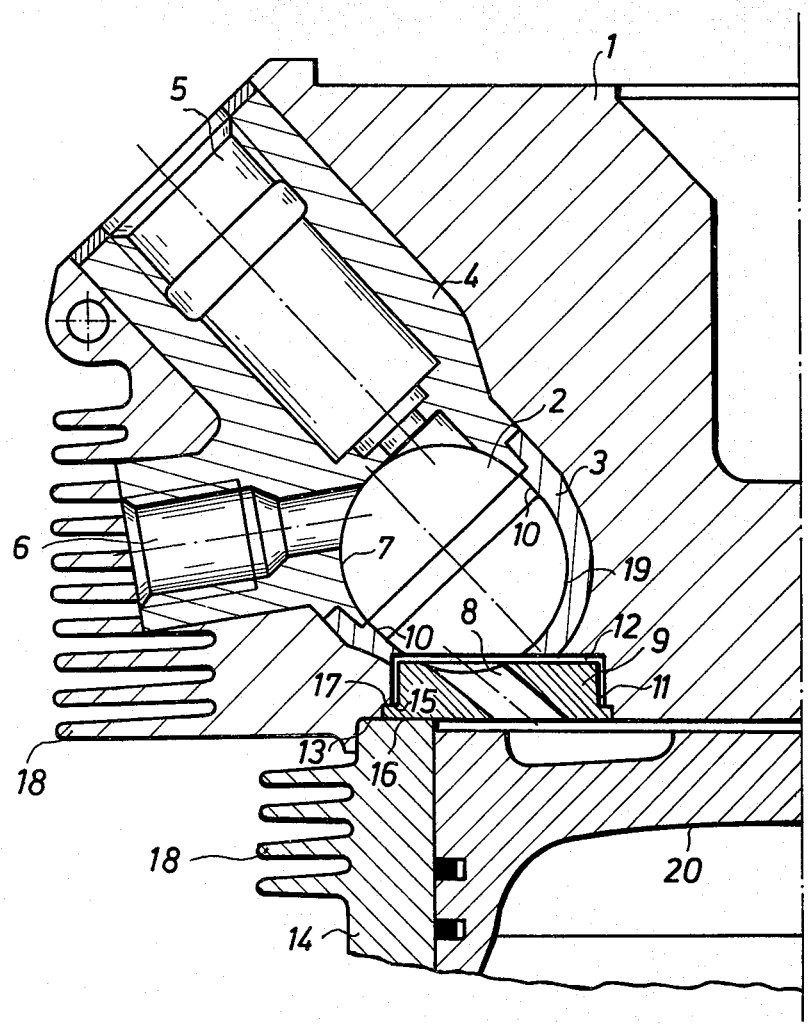

AIR-COOLED INJECTION INTERNAL COMBUSTION ENGINE WITH TURBULENCE CHAMBER

The present invention relates to an air-cooled injection internal combustion engine with a rotation-symmetric turbulence chamber cast into the cylinder head and provided with a passage tangentially leading into said turbulence chamber, the length of said passage being slightly greater than the largest diameter of rotation. The fuel is adapted to be injected into the periphery of said turbulence chamber approximately parallel to the longitudinal axis of said turbulence chamber.

Internal combustion engines of this type are known and have proved highly satisfactory in practice. Recently, however, in view of the requirements to be met concerning the emission of harmful substances, new standards have to be met in this field which require further improvements.

Water-cooled injection internal combustion engines with a turbulence chamber have become known (A. Pischinger "Gemischbildung und Verbrennung im Dieselmotor," Seite 48, Wien 1957 und DT-PS 645 621), in which a portion of the inner mantle surface of the turbulence chamber is formed by an insert of heat insulated and heat resistant material, which insert receives the passage. This insert forms approximately half of the inner mantle surface of the ball-shaped or ellipsoidal turbulence chamber. The heat insulation of the insert brings about that the adjacent structural elements will remain cooler, whereas the insert itself is heated up and its stored heat is transmitted to the combustion air which passes through said passage, whereby the conditions of ignition in the turbulence chamber are improved. Furthermore, with the heretofore known internal combustion engine the fuel jet is for improving the ignition directed toward the hot insert.

Furthermore, compression injection internal combustion engines with turbulence chamber have become known in which the wall of the turbulence chamber is provided with cooling and heating devices by means of which any desired wall temperature variable in conformity with a factor of operation can be realized. This step, which requires a greater number of structural elements, serves for improving the combustion in all ranges of operation of the internal combustion engine.

It is an object of the present invention with air-cooled internal combustion engines of the type mentioned above to improve the combustion with simple means, especially with regard to the emission in the exhaust of harmful substances.

This object and other objects and advantages of the invention will appear more clearly from the following specification in connection with the accompanying drawing illustrating a partial cross section through a cylinder and cylinder head with cast in turbulence chamber according to the present invention.

The air-cooled internal combustion engine according to the present invention which is provided with a rotation-symmetric turbulence chamber cast into the cylinder head and provided with a passage tangentially leading into said turbulence chamber, while the length of said passage is slightly greater than the greatest diameter of rotation and into which turbulence chamber the fuel is injected into the periphery of said chamber approximately parallel to the longitudinal axis of said chamber, is characterized primarily in that a part of the inner mantle surface of the turbulence chamber, which part is not hit by the fuel jet and is less than a quarter of the inner mantle surface, is formed by a well insulated insert of heat resistant material, which insert comprises said passage, while the medium height of said insert amounts to from one-fourth to one-third of the diameter of revolution, whereas its medium diameter amounts to from two-thirds to one total of the maximum diameter of revolution.

The arrangement according to the present invention makes it possible considerably to reduce the components of harmful substances in the exhaust gas, especially carbon monoxide, nitrogen oxide, and hydrocarbons. The employment of a heat insulated insert brings about that the wall temperatures of the remaining inner mantle surface of the turbulence chamber can be reduced by a maximum of 60° C. The wall temperatures of the cooler mantle surface, onto which the jet is directed, lie under full load in the temperature range of from 320° C to 370° C, which represents the optimum temperature range for the ignition and the preparation of the fuel air mixture. This wall temperature on the impact area of the fuel jet, which temperature is the most favorable one for the combustion, will be realized due to the fact that that part of the inner mantle surface of the turbulence chamber, which part is formed by the insert, is adapted to the air cooling conditions and is less than one-fourth of the entire mantle surface. In this way it will be avoided that the overheated wall parts of the heat insulated insert come in direct contact with the liquid fuel, so that cracking reactions of the fuel will not occur which otherwise result in increased formation of soot and an increased concentration of carbon monoxide in the exhaust gases. On the other hand, the heat regulating effect of the insert is not sacrificed, whereby that part of the combustion air which flows into the turbulence chamber is uniformly heated, and from the mixture which flows out at increased pressure from the turbulence chamber and consists primarily of air, fuel, and combustion products, determined by the magnitude of the heat insulated insert, only such quantity of heat is withdrawn as is necessary for heating up the combustion air. As a result thereof, in addition to an improvement in the quietness at which the motor runs, above all a considerable reduction in the concentration of nitrogen oxide and hydrocarbons will be realized in the exhaust gas. In order to maintain this heat regulating effect in a manner which is favorable for the combustion, the heat storing capacity, as well as the magnitude of those surfaces of the insert which come into contact with the combustion air are determined in conformity with the size of the turbulence chamber. Since the shape of the turbulence chamber, as well as the shape of the insert, frequently deviates slightly from a true body of rotation, the above characteristic features are referred to a medium diameter and a medium height by which in a first approximation the voluminae of the bodies are determined by the medium height of the insert, substantially also the length of the passage, and thereby the heat transfer from the insert to the combustion air is determined.

Referring now to the drawing in detail, the cylinder head 1 has cast thereinto a turbulence chamber 2, which is composed of two parts 3 and 4. Part 4 has openings 5 and 6 for receiving an injection nozzle and igniting device not illustrated in the drawing.

One part of the inner mantle surface of the turbulence chamber 2 which is not hit by the fuel jet and which is smaller than one-fourth of the inner mantle surface 7 is formed by a well insulated insert 9, which comprises the passage 8 and the medium height of which amounts to from one-fourth to one-third of the maximum diameter 10 of revolution of the turbulence chamber 2, whereas the medium diameter amounts from two-thirds to one total of the maximum diameter of revolution 10 of the turbulence chamber 2. The heat insulation is formed by an air gap 11 at the circumference of the insert 9. While between that end face of the insert member 9, which is located at the side of the turbulence chamber, and the cylinder head, there is likewise provided an air gap 12, the insert member 9 has a part of its end face on the combustion chamber side in engagement with the upper rim 13 of a cylinder 14. The insert member 9 is, by means of a collar 15, held between an abutment surface 16 on cylinder 14 and a protrusion 17 in the cylinder 1. For purposes of cooling the cylinder 14 and the cylinder head 1, cooling fins 18 are provided. As heat resistant material for the insert 9, any standard heat resistant material employed in connection with combustion chambers of internal combustion engines may be used.

During a compression stroke, a portion of the combustion air is by means of a piston displaced from the cylinder 14 to the turbulence chamber 2. When this occurs, the combustion air passes through the passage 8 and is heated up by the hot wall parts of the insert 9. Toward the end of the compression stroke, fuel is, by the non-illustrated injection nozzle, injected into the range 19 of the turbulence chamber 2. When the ignition temperature has been reached, the fuel ignites and brings about a partial combustion in the turbulence chamber. The combustion products and the remaining fuel air mixture flow at increased pressure into the turbulence chamber through said passage 8 into the main combustion chamber, in which the second step of the combustion is effected at a lower pressure and temperature level. By means of the hot mixture which passes through the passage 8 and is composed primarily of combustion products, air and fuel, the heat conveyed by the insert onto the combustion air is again conveyed to the insert.

The occurring high temperatures in the insert 9 will during the compression stroke aid the heat transfer to the combustion air passing through the passage 8, while the direct contact of the fuel with the overheated wall portions is avoided.

It is, of course, to be understood that the present invention is by no means limited to the specific showing in the drawing, but also comprises any modifications within the scope of the appended claims.

What I claim is:

1. An air-cooled fuel injection internal combustion engine comprising a cylinder and a cylinder head with a turbulence chamber with a longitudinal axis and an inner mantle surface, the turbulence chamber having a length slightly greater than its maximum diameter of revolution and having a fuel injection passage tangential thereto for injecting fuel approximately parallel to the longitudinal axis of said turbulence chamber into the periphery thereof, which includes in combination therewith a heat insulated insert member having a passageway therethrough and forming a portion of that inner surface of said turbulence chamber which is located outside that range of surface which is to be impacted upon by the fuel during the fuel injection period, that inner mantle surface portion of said turbulence chamber which is formed by said insert member only being less than a quarter of the total inner mantle surface of said turbulence chamber, and said insert member having a medium height equaling from one quarter to one-third of said diameter of revolution and having a medium diameter equaling from two-thirds to one total of said maximum diameter of revolution.

* * * * *